United States Patent [19]

Schonball

[11] 4,362,466

[45] Dec. 7, 1982

[54] WIND-OPERATED POWER-GENERATORS AND WIND WHEELS THEREFOR

[76] Inventor: Walter Schonball, Gielsdolferstrasse 16, 5300 Bonn 1, Fed. Rep. of Germany

[21] Appl. No.: 171,595

[22] Filed: Jul. 23, 1980

[51] Int. Cl.³ .............................................. F03D 7/02
[52] U.S. Cl. ...................................... 416/142; 416/41
[58] Field of Search .................. 416/142 B, 41 A, 16, 416/170 A

[56] References Cited

U.S. PATENT DOCUMENTS

| | | | |
|---|---|---|---|
| 529,358 | 11/1894 | Boisclair | 416/41 A X |
| 756,616 | 4/1904 | Fornander | 416/41 A X |
| 838,837 | 12/1906 | Ayers | 416/142 B X |
| 1,707,235 | 4/1929 | Sargent | 416/227 A X |
| 1,963,912 | 6/1934 | Honnef | 416/121 A |
| 2,094,917 | 10/1937 | Dunn | 416/16 X |
| 2,140,152 | 12/1938 | Dunn | 416/16 X |
| 4,142,830 | 3/1979 | Schonball | 416/41 A |
| 4,183,717 | 1/1980 | Yamada | 416/142 B X |

FOREIGN PATENT DOCUMENTS

| | | | |
|---|---|---|---|
| 120624 | 11/1945 | Australia | 416/16 |
| 535625 | 1/1932 | Fed. Rep. of Germany | 416/41 A |
| 871580 | 3/1953 | Fed. Rep. of Germany | 416/9 |
| 2558848 | 9/1976 | Fed. Rep. of Germany | 416/16 |
| 1235923 | 6/1960 | France | 416/41 A |

Primary Examiner—Everette A. Powell, Jr.
Attorney, Agent, or Firm—Hubbard, Thurman, Turner & Tucker

[57] ABSTRACT

A wind-wheel for a wind-operated power generator comprises a rotor shaft, carrying the vanes of the wind-wheel, and mounted at its ends in rotary bearings supported by a frame. The frame is mounted on the top of a tower by means of a support member which itself is rotatable about a vertical axis through the tower. The connection between the support member and the frame enables the frame to be rotated about a horizontal axis below the bottom of the vanes. In a high wind, the wind-wheel can, thus, swing out of the vertical plane, spilling wind from the vanes, to avoid damage.

1 Claim, 2 Drawing Figures

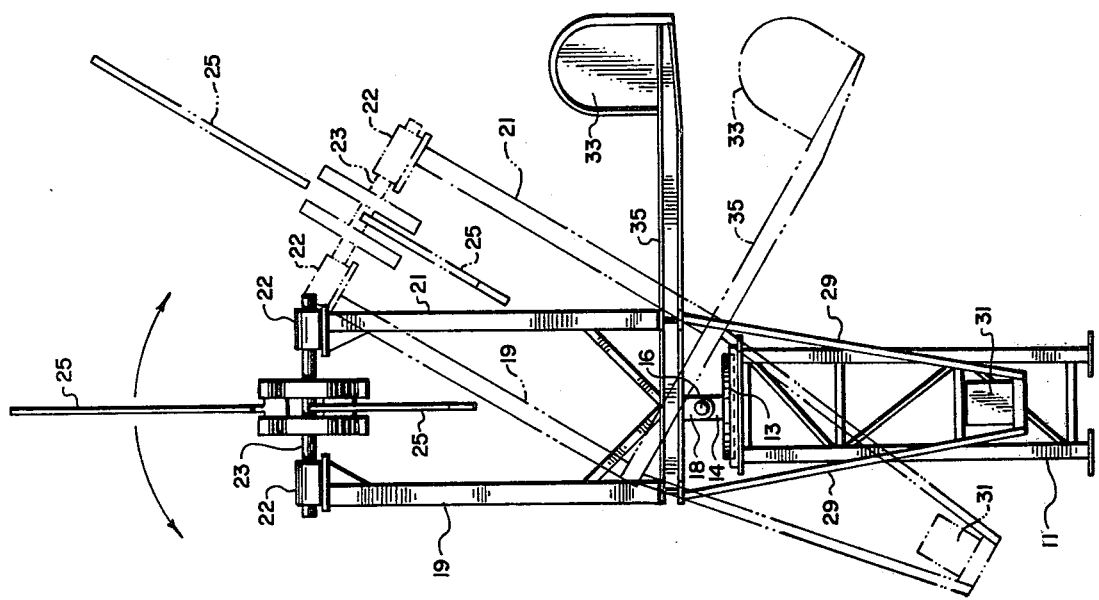
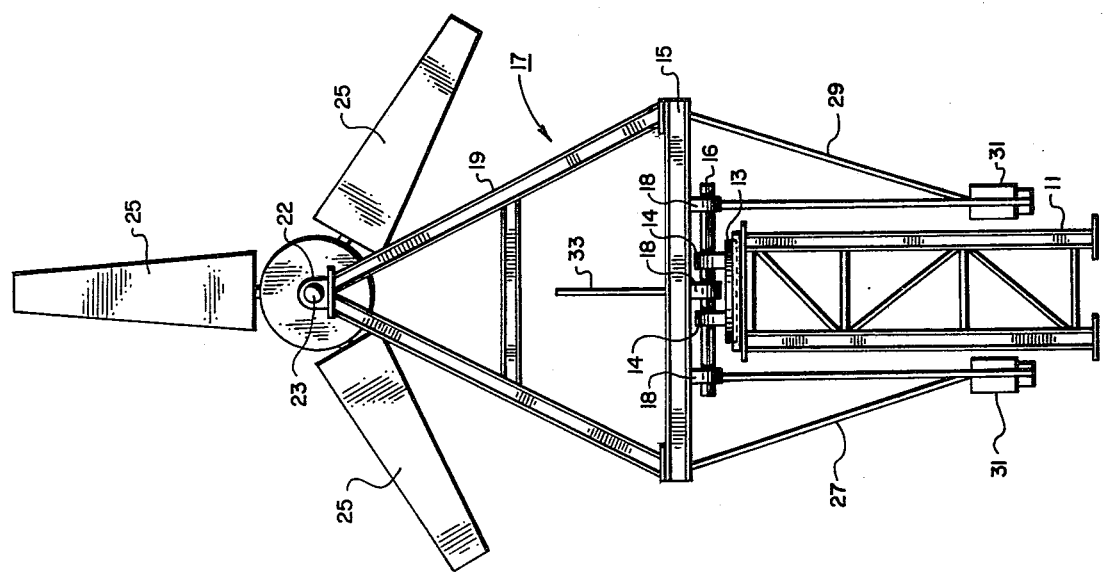

WIND-OPERATED POWER-GENERATORS AND WIND WHEELS THEREFOR

BACKGROUND OF THE INVENTION

The present invention relates wind-operated power generators and wind-wheels therefor.

Wind-operated power generators generally consist of an elevated wind-wheel adapted for rotation about a substantially horizontal axis under the impact of the wind. The wind-wheel is rotatable above a vertical axis so as to maintain the said horizontal axis parallel to the wind direction.

However, there is a risk, particularly with large wind-wheels, that in a strong wind the force exerted on the vanes of the wind-wheel will be so strong that the vanes will be damaged or destroyed. To prevent this happening it has been proposed that the wind-wheel be so constructed as to turn about the vertical axis when particularly strong winds are experienced. The disadvantage of this is that if a fast, rotating wind-wheel is suddenly moved in this way a large girostatic movement is created, which itself tends to damage or destroy the wind-wheel.

It is an object of the present invention to provide a novel construction for a wind-wheel which enables the wheel to turn out of a strong wind without damage.

SUMMARY OF THE INVENTION

According to the invention a wind-wheel comprises a shaft which carries the vanes of the wind-wheel and a frame in which the shaft is journalled for rotation, said frame being mounted at its lower end for rotation about a horizontal axis, which is located below the bottom of the vanes, to a roller-member which is rotatable about a vertical axis.

BRIEF DESCRIPTION OF THE DRAWINGS

A preferred embodiment of the invention will now be described by way of example only with reference to the accompanying drawings in which:

FIG. 1 is a front elevation of a wind-operated power generator embodying the invention; and, FIG. 2 is a side elevation of the generator shown in FIG. 1.

As shown in the drawings, the wind-operated power generator comprises a tower structure 11 on the top of which is mounted, by means of roller bearings (not shown), a support member 13 which is rotatable above a vertical axis through the center of the tower structure 11.

The support member 13 has upstanding from it a pair of bearings 14 which receive a mounting shaft 16 which is fixedly secured to the bottom of a platform 15 by means of lugs 18. A frame 17 is mounted on the platform 15 and comprises front and rear A-frame members 19 and 21 which extend upwardly at right angles to the plane of the platform 15. The upper ends of the frame members 19 and 21 support rotary bearings 22 in which are journalled the ends of a rotor shaft 23, which shaft 23 carries vanes 25 of the wind-wheel of the generator. The rotor shaft 23 is coupled to suitable means (not shown) for transmitting its rotation downwardly to the equipment or machine which the generator is to drive. The means are of conventional construction and will not be further described.

Depending from the platform 15 are left and right side pairs of arms 27 and 29, which at their lower ends carry counterweights 31. The counterweights 31 are movable along the support arms 27 and 29, thus changing the balance position of the wind-wheel enabling the orientation of the plane of the wind-wheel to the vertical to be adjusted. This enables the device to be adjusted so that the vanes will be normally set in the optimum disposition for use adjacent a hill or a building when the wind flow is not horizontal.

The arrangement may be such that the counterweights 31 can be raised sufficiently for the wind-wheel to swing down below the axis of the shaft 16, so as to be readily disassembled during maintenance. Such a device would also show advantabes in ease of installation.

In operation, the vanes are normally held in a plane at right angles to the direction of the wind so as to maximize the force of the wind. Rotation of the support member 13 about the vertical axis on its roller bearings enables the vanes to maintain this optimum direction. To ensure the correct heading of the wind-wheel, a vane 33 is carried at the outer end of a horizontal tail 35 extending from the platform 15.

The counterweights 31 are so chosen as normally to balance the weight of the wind-wheel and normal wind forces and maintain the vanes of the wind-wheel in a vertical plane. However, if the wind force increases beyond a certain value, the wind-wheel is free to rotate about the horizontal shaft 16, moving the vanes 25 out of the vertical plane and reducing the effective wind force acting on them. The wind-wheel is shown in this position by the phantom lines in FIG. 2. The counterweights 31 are lifted upwardly during this movement and when the wind force abates will return the wind-wheel to its original position.

It is seen from the foregoing description that the present invention provides the following advantageous features:

(1) the plane of the wind-wheel is able to rotate in four directions, two horizontal and two vertical;
(2) the weight of the wind-wheels remains centered over the supporting tower during such movements;
(3) the supports for the rotor shaft of the wind-wheel can be spaced sufficiently far away from the vanes to avoid turbulence effects.
(4) the rotor shaft can be supported, braked and regulated at both ends, enabling a rigid, economic and aerodynamically sound construction.
(5) the height of the tower itself may be less than would be needed for the same height of windwheel on a conventional construction in which the rotor shaft is disposed adjacent the top of the tower.

Although a preferred embodiment of the invention has been described in detail, it should be understood that various changes, substitutions, and alterations can be made therein without departing from the spirit and scope of the invention as defined by the appended claims.

What is claimed is:

1. A wind operated power generator comprising:
   a tower structure;
   a wind-wheel comprising a plurality of vanes carried by a rotor shaft and arranged normally to occupy a vertical plane through the center of said tower structure;
   a pair of spaced apart frame members in which the ends of said rotor shaft are journalled;

a platform member supporting said frame members, which are upstanding therefrom;

means rotatably connecting said platform member to a horizontal shaft, carried by a support member and disposed below the bottom of the vanes; and counterweight means depending from said platform by means of support arms along which said counterweight means are adjustably movable;

said plurality of vanes and said counterweight means being disposed to lie in the vertical plane with said horizontal shaft, and being horizontally rotatable about said shaft to maintain the weight of the windwheel centered over said horizontal shaft.

* * * * *